United States Patent [19]

McGough et al.

[11] 4,248,601
[45] Feb. 3, 1981

[54] PROCESS FOR REDUCING THE SODIUM CHLORIDE CONTENT OF A POTASSIUM SALT

[75] Inventors: Eugene R. McGough, Carlsbad, N. Mex.; Albert Adams, Oklahoma City, Okla.

[73] Assignee: Kerr-McGee Chemical Corporation, Oklaohma City, Okla.

[21] Appl. No.: 57,002

[22] Filed: Jul. 12, 1979

[51] Int. Cl.³ ............................................. C01D 3/04
[52] U.S. Cl. .............................. 23/293 R; 23/313 R; 71/63; 71/64 DC; 422/251; 423/179; 423/184; 423/499; 423/551
[58] Field of Search ................. 23/293 R, 297, 313 R; 422/251, 252; 423/179, 184, 499, 551; 264/117; 71/63, 64 R, 64 DC

[56] References Cited

U.S. PATENT DOCUMENTS

| | | | |
|---|---|---|---|
| Re. 18,393 | 3/1932 | Pike et al. ........................... | 23/297 X |
| 24,951 | 8/1959 | Pemberton . | |
| 1,589,519 | 4/1925 | Dolbear . | |
| 1,688,873 | 10/1928 | McGrane ............................ | 23/297 |
| 1,883,262 | 10/1932 | Woodward . | |
| 2,329,505 | 9/1943 | Zimmermann ..................... | 23/297 |
| 2,798,796 | 7/1957 | Crewson et al. . | |
| 2,927,010 | 3/1960 | LeBaron ............................. | 23/297 |
| 2,935,387 | 5/1960 | Phillips ............................. | 23/313 R |
| 3,058,729 | 10/1962 | Dahms et al. . | |
| 3,440,023 | 4/1969 | Hoppe et al. ....................... | 23/297 |
| 3,440,033 | 4/1969 | Vasan ............................ | 23/313 R X |
| 3,466,161 | 9/1969 | Perlmutter et al. .............. | 23/313 R X |
| 3,512,945 | 5/1970 | Taylor et al. .................... | 23/293 R X |
| 3,620,709 | 11/1971 | Petkovsek et al. .............. | 23/313 R X |
| 3,642,454 | 2/1972 | Nylander ........................... | 23/297 |
| 4,094,956 | 6/1978 | Bieler ................................ | 423/179 |

FOREIGN PATENT DOCUMENTS

| | | | |
|---|---|---|---|
| 545197 | 8/1957 | Canada ................................ | 23/297 |
| 497577 | 12/1919 | France ................................. | 23/297 |

*Primary Examiner*—Richard L. Chiesa
*Attorney, Agent, or Firm*—William G. Addison

[57] ABSTRACT

A process for reducing the sodium chloride content of crystalline potassium salts without the use of successive recrystallization. The crystalline potassium salts having a sodium chloride content greater than about 0.8 percent by weight are subjected to compacting and crushing to provide a crystalline product having an average particle diameter less than 1.6 millimeters. The crystalline product is leached with a brine at least about 80 percent saturated with said potassium salt and less than 50 percent saturated with sodium chloride to produce a crystalline potassium salt product containing less than about 0.35 percent by weight of sodiumchloride.

12 Claims, 2 Drawing Figures

PROCESS FOR REDUCING THE SODIUM CHLORIDE CONTENT OF A POTASSIUM SALT

1. Background of the Invention

The present invention relates to a process for reducing the sodium chloride content of a potassium salt. More particularly the present invention relates to a process for reducing the sodium chloride content of potassium chloride or potassium sulfate.

2. Description of the Prior Art

The demand for potassium salts and particularly potassium chloride having a low sodium content is increasing. Plants which consume large amounts of this commodity, principally for the production of potassium hydroxide, have relied on supply sources which have required little processing to provide a high quality product and which are not so distant that high shipping costs would be borne. Plants which produce potassium chloride having a low sodium content soon will be unable to supply the demands for such a product as a result of environmental and economic considerations. As a result of the inability of the present suppliers to meet the demand of the industry for this commodity, new sources must be found. Consequently, it is becoming increasingly necessary to consider utilizing existing salt bodies which do not meet the necessary product grade requirements but which can be upgraded in an inexpensive manner. It then is essential to devise a minimally expensive method of upgrading the raw potassium salt obtained from these lower purity deposits.

References to potassium salt purification and particularly to potassium chloride purification to obtain a high quality product, as have been found in the literature, are concerned with processes such as fractional crystallization or selective precipitation, which are carried out on potassium salt solutions. The most commonly employed method of removing sodium chloride from a potassium salt is by successive recrystallization. Application of this method to large quantities of potassium salts results in a considerable expenditure of energy for water removal which is required by the crystallization process. Consequently, this method is not economically attractive. Thus, a need for an efficient and economical method of reducing the sodium chloride content of a potassium salt such as potassium chloride or potassium sulfate is evident.

SUMMARY OF THE INVENTION

The present invention provides a process for reducing the sodium chloride content of a potassium salt, particularly potassium chloride or potassium sulfate.

In qualitative terms, the invention may be defined as a process for reducing the sodium chloride content of crystalline potassium salts which comprises compacting and then crushing the crystalline particles to a size less than 1.5 millimeters in diameter and leaching the embedded or entrapped sodium chloride from said crystalline material by contact with a brine containing said potassium salt and separating the crystals from the leaching liquor.

More precisely, the invention is defined as a process for reducing the sodium chloride content of a potassium salt, said process comprising:

a. providing crystalline aggregates of a potassium salt containing in excess of about 0.8 percent by weight sodium chloride as embedded crystals or entrapped brine, b. compacting said crystalline aggregates to produce a cake of uniform thickness which then is crushed and graded to separate compacted material having a particle diameter greater than about 1.6 millimeters, c. introducing the remaining compacted material into a leaching zone in admixture with a brine at least 80 percent or more saturated with said potassium salt and less than 10 percent saturated with sodium chloride to extract said sodium chloride contained in said crystalline aggregates to provide a leached product containing less than about 0.35 percent by weight of sodium chloride, and d. separating said leached product from said brine in said leaching zone.

The separated potassium salt product can be washed with water or additional fresh brine to remove retained higher sodium chloride content brine from the product. Preferably, prior to introducing the compacted crystalline aggregates into the leach zone, the aggregate is crushed to a particle size having a diameter less than about 0.7 millimeters to thereby fracture the crystalline material to expose the embedded sodium chloride crystals to the leach liquor.

DESCRIPTION OF THE PREFERRED EMBODIMENT

The present invention is a process for reducing the sodium chloride content of a potassium salt. The latter term being employed herein to include not only naturally formed potassium salt deposits but also man-made salts of generally similar characteristics. To facilitate a description of the present invention, particular reference hereafter will be made to the utilization of the present invention in connection with a process for producing crystalline potassium chloride from sylvinite, a simple potassium chloride-sodium chloride material, by conventional leach-crystallization methods.

Typically, crystallized potassium chloride is produced in two grades, agricultural and industrial. Agricultural grade, 95 to 98 percent pure potassium chloride, is produced by a single cycle leach-crystallization process. Industrial grade, 99.5 to 99.9 percent pure potassium chloride, is produced by successive recrystallization of agricultural grade potassium chloride.

The present invention permits agricultural grade potassium chloride to be upgraded to substantially industrial grade quality without the necessity of recrystallization.

Figure 1:
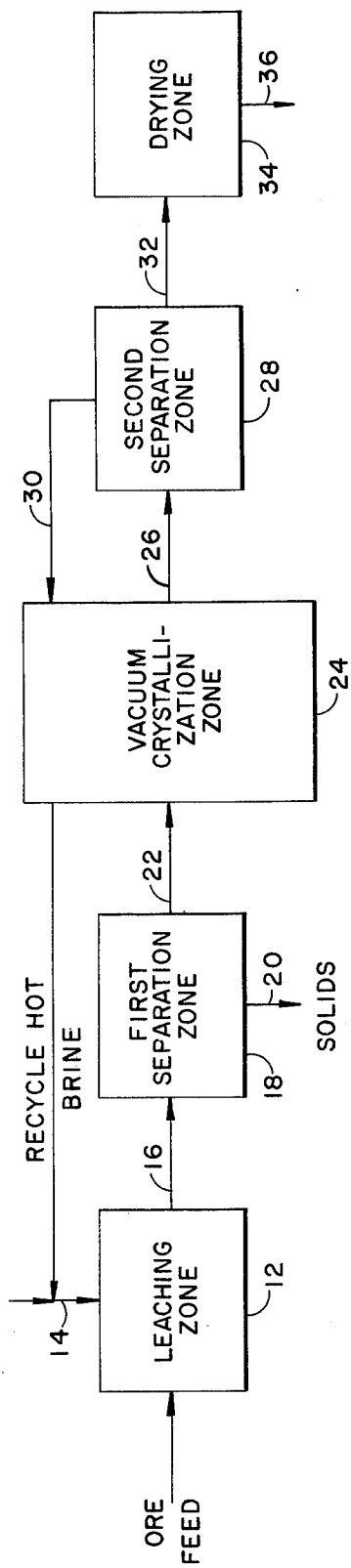
FIG. 1 is a diagrammatic illustration of a leaching-crystallization process for the production of potassium chloride.

Turning now to FIG. 1, a conventional leach-crystallization process for the production of agricultural grade potassium chloride is illustrated. Particulate sylvite ore is introduced as feed into a leaching zone 12 by a solids conveyor 10. The conveyor 10 may comprise any conventional apparatus capable of transporting the particulate solids, such as, for example, a belt conveyor.

In leaching zone 12, the sylvite ore feed is admixed with a brine introduced via a conduit 14 that is substantially saturated with sodium chloride and which has been heated to an elevated temperature. Preferably, the brine is heated to a temperature in the range of from about 140 degrees F. to about 212 degrees F. Potassium chloride, when in admixture with sodium chloride, is substantially soluble at elevated temperatures while the solubility of the sodium chloride is reduced at elevated temperatures. For example, 100 parts of water will dissolve approximately 10.4 parts of potassium chloride and 31.9 parts of sodium chloride at 32 degrees F. while 100 parts of water will dissolve 35.9 parts of potassium chloride and only 25.7 parts of sodium chloride at 212 degrees F. Therefore, the elevated temperature brine, which already is substantially saturated with sodium chloride, extracts the potassium chloride from the ore feed while dissolving little, if any, of the sodium chloride present in the ore feed. The slurry of feed and brine then is withdrawn from leaching zone 12 through a conduit 16 and introduced into a separation zone 18.

In the separation zone 18, the undissolved components contained in the slurry are separated from the brine and withdrawn through a conduit 20 for disposal. Separation zone 18 may comprise any of the known conventional apparatus for separating fines and other undissolved ore, for example, thickeners, filters or centrifuges or a combinaton of such apparatus. The elevated temperature clear brine is withdrawn from separation zone 18 through a conduit 22 and introduced into a vacuum crystallization zone 24. The vacuum crystallization zone 24 may comprise any of the conventionally known apparatus which effects crystallization by barometric cooling of a brine.

Normally, vacuum crystallization zone 24 will comprise a series of vacuum cooler-crystallizer vessels. The vacuum crystallization zone 20 causes the elevated temperature clear brine to be substantially reduced in temperature and thereby causes potassium chloride to precipitate as a result of its reduced solubility in the lower temperature brine. The slurry of precipitated potassium chloride crystals and brine is withdrawn from vacuum crystallization zone 20 through a conduit 26 and introduced into a second separation zone 28.

In second separation zone 28, the precipitated potassium chloride crystals are separated from the brine and the crystalline material, including any entrained brine remaining after filtration, is withdrawn through a conduit 32 and introduced into a drying zone 34. Second separation zone 28 may comprise any conventional separation apparatus, such as, for example, filters or centrifuges. Drying zone 34 is operated under conditions such that entrained moisture is removed from the potassium chloride crystals to produce crystalline aggregates of agricultural grade potassium chloride which are withdrawn through a conduit 36. Drying zone 34 may comprise any conventional drying apparatus, such as, for example, a rotary kiln dryer.

The brine separated in filtration zone 28 is recycled through a conduit 30 for reutilization in leaching zone 12. Advantageously, the brine is at least partially reheated through countercurrent heat exchange accomplished in vacuum crystallization zone 24.

Agricultural grade potassium chloride normally is divided into three products comprising granular, coarse and standard size products. The crystalline aggregate in conduit 36 normally is subjected to grading to recover the granular and coarse grade products for sale as agricultural fertilizer. The remainder of the crystalline aggregate, comprising the standard size product and having a particle size capable of passing through a screen having 1.68 millimeter openings, is employed as feed to the process of the present invention. The agricultural grade potassium chloride product produced by the process hereinabove described normally will contain at least about 0.8 percent by weight sodium chloride as crystals which are embedded within the crystalline aggregate or as sodium chloride brine entrapped during formation and growth of the potassium chloride crystals.

Figure 2:
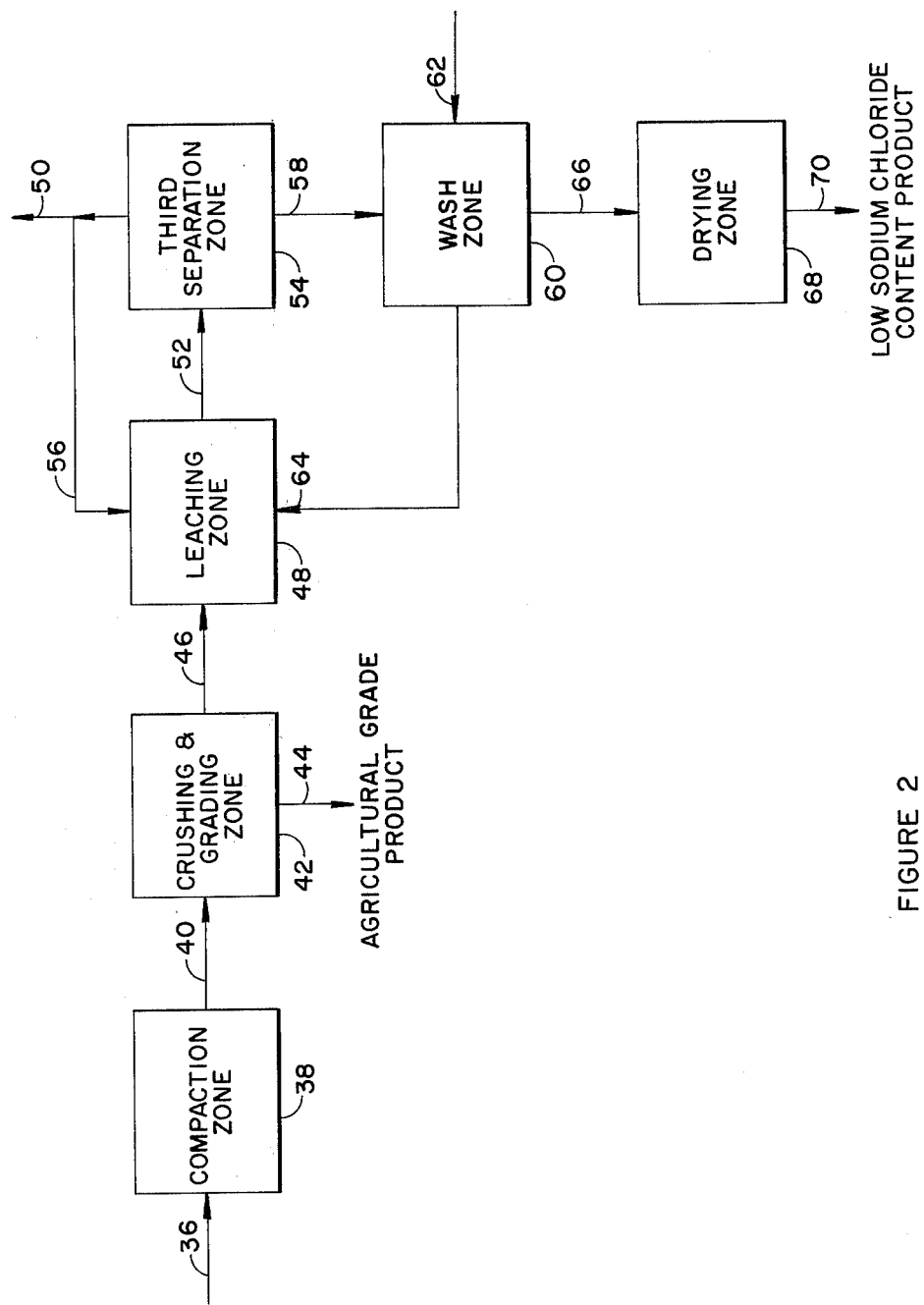
FIG. 2 is a diagrammatic illustration of the process of the present invention.

Turning now to FIG. 2, the remaining crystalline aggregate, after separation of the granular and coarse products, is introduced into a compaction zone 38. Compaction zone 38 may comprise any conventionally known apparatus that is capable of producing a cake of uniform thickness, such as, for example, an Allis-Chalmers compactor, Allis-Chalmers, Mining Systems Division, Milwaukee, Wis. In one embodiment, compaction zone 38 produces a product consisting of a cake 6.5 millimeters thick. The compactor product is withdrawn from the compaction zone 38 by a conveyor 40 and introduced into a crushing and grading zone 42.

In crushing and grading zone 42 the compactor product is crushed and graded to yield additional granular and coarse agricultural grade potassium chloride product. The granular and coarse grade product is withdrawn from crushing and grading zone 42 through a conduit 44 for recovery. The crushing and grading zone 42 may comprise any of the conventionally known apparatus suitable for performing the designated function, such as, for example, a Pennsylvania crusher, Pennsylvania Crusher Corporation, Broomall, Pa., and a Tyler screen, The W. S. Tyler Company, Cleveland, Ohio.

The remainder of the compactor product, normally referred to as fines by individuals skilled in the art, is withdrawn from crushing and grading zone 42 through a conduit 46 and introduced into a leaching zone 48. Preferably the remaining material is subjected to an additional crushing within crushing and grading zone 42 prior to withdrawal to reduce the particle size of the compacted material to a particle having a diameter less than about 0.7 millimeters, and most preferably to a particle having a diameter less than about 0.5 millimeters. While the mechanism is not fully understood, it is believed that the compacting of the crystalline aggregate results in a deformation of the sodium chloride crystals that are embedded therein. The deformation increases the surface area of the sodium chloride crystals by a factor of four or five times the original surface area. Thereafter, when the compacted material is crushed, the opportunity of exposing a surface of the embedded sodium chloride crystals is substantially enhanced and thereby permits a more efficient leaching.

In leaching zone 48 the remaining compacted material is admixed with a brine introduced via a conduit 56 that is 80 percent or more saturated with potassium chloride and less than 50 percent saturated with sodium chloride. Preferably, the brine is admixed with the compacted material in a ratio, by weight, of brine to compacted material of at least about 1:1 and most preferably in a ratio in the range of from about 1:1 to 2:1. It is to be understood that larger quantities of brine can be used, however, such larger quantities do not significantly improve the extraction of the sodium chloride from the crystalline potassium chloride in relation to the increased brine volume.

The brine is contacted with the compacted material for a period of time sufficient to at least extract a portion of the sodium chloride present in the crystalline potassium chloride, while little, if any, of the crystalline potassium chloride dissolves in leaching zone 48. To facilitate leaching, preferably, the brine is at least about 90 percent saturated with potassium chloride and less than about 10 percent saturated with sodium chloride.

The leaching can be effected at a temperature of from about 32 degrees F. to about 212 degrees F. and preferably is effected at about ambient temperature.

The mixture of crystallized potassium chloride and brine is withdrawn from leaching zone 48 through a conduit 52 and introduced into a third separation zone 54. Third separation zone 54 may comprise, for example, a centrifuge.

The brine separated within the third separation zone 54 is withdrawn through a conduit 56 and recycled to the leaching zone 48 for reutilization. At least a portion of the recycled brine is withdrawn from conduit 56 through a conduit 50 as a bleed to reduce the sodium chloride content of the brine.

The separated crystalline potassium chloride is withdrawn from separation zone 54 through a conduit 58 and introduced into a wash zone 60. The separated crystalline potassium chloride normally will contain less than 0.35 percent by weight sodium chloride.

In the wash zone 60, the separated crystalline potassium chloride is contacted with additional brine or other wash liquid introduced through a conduit 62. The washing operation effectively removes any entrained higher sodium chloride content brine from the crystalline material and further reduces the sodium chloride content of the crystalline potassium chloride product. The wash liquid is withdrawn from the wash zone 60 through a conduit 64 and preferably, is introduced into leaching zone 48 to replace the brine which has been withdrawn through conduit 50 or otherwise lost in the processing of the crystalline material.

The washed crystalline potassium chloride is withdrawn from wash zone 60 through a conduit 66 and introduced into a drying zone 68. Drying zone 68 operates to remove any remaining moisture from the crystalline material to produce a dried crystalline potassium chloride product containing less than about 0.35 percent by weight of sodium chloride. The product is withdrawn through a conduit 70 and recovered. The drying zone 68 may comprise any conventional apparatus suitable for performing the designated function, such apparatus being well known by those skilled in the art.

Surprisingly, it has been found that the compaction step in the process hereinbefore described is critical to the satisfactory leaching of the crystalline potassium chloride while employing a minimum of crushing to effect size reduced. It has been found that it is not possible to leach uncompacted standard grade agricultural product of the same particle size as compacted material for a similar period of time and obtain the same low sodium chloride content product. The uncompacted product must be crushed to a particle size approximately 50 percent finer than the compacted product to achieve similar results in the amount of sodium chloride removed from the crystalline potassium chloride. Such additional crushing or grinding is highly undesirable in that it produces an excessively fine product that creates substantial materials handling problems. Further, it requires substantially more energy and thereby results in a substantially higher expense in manufacture which would be uneconomical.

For the purpose of illustration, and not by way of limitation, the following example is provided.

EXAMPLE

A sample of standard agricultural grade potassium chloride containing approximately 1 percent sodium chloride is divided into approximately 2 equal portions. The first portion is crushed to a particle size having a diameter less than about 0.7 millimeters and admixed with a brine saturated with potassium chloride and containing less than 0.5 percent by weight of sodium chloride to provide a mixture containing 50 percent solids by weight. The admixture is pulped for 30 minutes at a temperature of about 70 degrees F. The admixture then is filtered and the filter cake is washed with an additional quantity of fresh leach brine comprising about 5 percent by weight of the solids. The sample of the filter cake is analyzed and found to contain in excess of 0.8 percent by weight sodium chloride.

The remaining portion of the standard agricultural grade product is subjected to compaction, crushing and screening to provide a sample of fines having a diameter less than about 1.6 millimeters. The fines then are crushed to provide crystalline potassium chloride having a particle diameter less than about 0.7 millimeters. This material then is admixed with saturated potassium chloride brine containing less than about 0.5 percent by weight of sodium chloride to provide a mixture containing 50 percent solids by weight. The admixture is pulped for 30 minutes at a temperature of about 70 degrees F. The admixture then is filtered and the filter cake is washed with an additional quantity of fresh leach brine comprising about 5 percent by weight of the solids. A sample of the washed filter cake is analyzed and found to contain less than about 0.35 percent by weight sodium chloride.

The results of the test clearly demonstrates the benefit which is to be derived through the use of the present invention to reduce the sodium chloride content of a potassium salt.

The term "percent saturated" means a solution of a mixture of solutes at the particular temperature at which the process of the present invention is operating in which the designated percentage of the total quantity of each solute is dissolved in the solution as can be dissolved at that temperature if in the presence of solid particles of said solutes.

While specific embodiments of the invention have been shown to illustrate the application of the principles of this invention, it is to be understood that changes or modifications can be made in the process or apparatus without departing from the spirit or scope of this invention as defined in the following claims.

What is claimed is:

1. A process for reducing the sodium chloride content of a potassium salt, which comprises:
providing crystalline aggregates of a potassium salt containing in excess of about 0.8 percent by weight of sodium chloride as embedded crystals or entrapped sodium chloride brine;
compacting said crystalline aggregates to produce a cake of uniform thickness;
crushing said cake;
grading said crushed cake to separate crystalline material having a particle diameter greater than about 1.6 millimeters;
introducing the crystalline material having a particle diameter less than about 1.6 millimeters into a leaching zone in admixture with a brine containing a further quantity of said potassium salt, said brine being less than 50 percent saturated with sodium chloride, to extract the embedded sodium chloride crystals or entrapped sodium chloride brine from said potassium salt crystalline aggregates to provide a crystalline potassium salt product containing less than about 0.35 percent by weight of sodium chloride; and separating said crystalline potassium salt product from said leaching zone and brine.

2. The process of claim 1 defined further to include the step of:

washing said separated crystalline potassium salt product to remove retained brine from said product.

3. The process of claim 1 wherein admixing of the brine and crystalline material having a particle diameter less than about 1.6 millimeters is defined further as:

admixing said brine and said crystalline material having a particle diameter less than about 1.6 millimeters in a ratio by weight of brine to said crystalline material greater than 1:1.

4. The process of claim 1 wherein admixing of the brine and crystalline material having a particle diameter less than about 1.6 millimeters is defined further as:

admixing said brine and said crystalline material having a particle diameter less than about 1.6 millimeters in a ratio by weight of brine to said crystalline material in the range of from about 1:1 to about 2:1.

5. The process of claim 1 defined further to include the step of:

crushing the crystalline material having a particle diameter less than about 1.6 millimeters prior to introduction into said leach zone to further reduce the material to particles having a diameter less than about 0.7 millimeters to thereby fracture the crystalline material comprising the potassium salt to expose the embedded sodium chloride crystals.

6. The process of claim 1 defined further to include the step of:

crushing the crystalline material having a particle diameter less than about 1.6 millimeters prior to introduction into said leach zone to further reduce the material to particles having a diameter less than about 0.5 millimeters to thereby fracture the crystalline material comprising the potassium salt to expose the embedded sodium chloride crystals.

7. The process of claim 1 in which the leach brine is defined further as a brine at least 90 percent saturated with said potassium salt and less than 10 percent saturated with sodium chloride.

8. The process of claim 1 wherein said leaching is defined further as being effected without substantial dissolution of the crystalline potassium salt present in said leach zone.

9. The process of claim 1 wherein said leaching is defined further as being effected at about ambient temperature.

10. The process of claim 1 in which the leach brine is defined further as a brine at least 80 percent saturated with said potassium salt.

11. A process for reducing the sodium chloride content of potassium chloride, which comprises:

providing crystalline aggregates of potassium chloride containing in excess of about 0.8 percent by weight of sodium chloride as embedded crystals or entrapped sodium chloride brine;

compacting said crystalline aggregates to produce a cake of uniform thickness;

crushing said cake;

grading said crushed cake to separate crystalline material having a particle diameter greater than about 1.6 millimeters;

introducing the crystalline material having a particle diameter less than about 1.6 millimeters into a leaching zone in admixture with a brine containing a further quantity of potassium chloride, said brine being less than 50 percent saturated with sodium chloride, to extract the embedded sodium chloride crystals or entrapped sodium chloride brine from said potassium chloride crystalline aggregates to provide a crystalline potassium chloride product containing less than about 0.5 percent by weight of sodium chloride; and separating said crystalline potassium chloride product from said leaching zone and brine.

12. A process for reducing the sodium chloride content of potassium sulfate, which comprises:

providing crystalline aggregates of potassium sulfate containing in excess of about 0.8 percent by weight of sodium chloride as embedded crystals or entrapped sodium chloride brine;

compacting said crystalline aggregates to produce a cake of uniform thickness;

crushing said cake;

grading said crushed cake to separate crystalline material having a particle diameter greater than about 1.6 millimeters;

introducing the crystalline material having a particle diameter less than about 1.6 millimeters into a leaching zone in admixture with a brine containing a further quantity of potassium sulfate, said brine being less than 50 percent saturated with sodium chloride, to extract the embedded sodium chloride crystals or entrapped sodium chloride brine from said potassium sulfate crystalline aggregates to provide a crystalline potassium salt product containing less than about 0.35 percent by weight of sodium chloride; and separating said crystalline potassium sulfate product from said leaching zone and brine.

* * * * *

UNITED STATES PATENT AND TRADEMARK OFFICE
CERTIFICATE OF CORRECTION

PATENT NO. : 4,248,601
DATED : February 3, 1981
INVENTOR(S) : Eugene R. McGough and Albert Adams It is certified that error appears in the above-identified patent and that said Letters Patent are hereby corrected as shown below:

Column 8, line 28, "0.5 percent by weight" should read

-- 0.35 percent by weight --

Signed and Sealed this

Twelfth Day of May 1981

[SEAL]

Attest:

RENE D. TEGTMEYER

Attesting Officer     Acting Commissioner of Patents and Trademarks